F. W. BROOKS.

Improvement in Seals for Locks.

No. 4,872. Reissued April 16, 1872.

WITNESSES.

Walter Allen

W. H. Pearce

INVENTOR.

Franklin W. Brooks

By Knight Bros

Attorneys

AM. PHOTO-LITHOGRAPHIC CO. N.Y. (OSBORNE'S PROCESS.)

UNITED STATES PATENT OFFICE.

FRANKLIN W. BROOKS, OF NEW YORK, N. Y., ASSIGNOR TO AMERICAN SEAL-LOCK COMPANY, OF SAME PLACE.

IMPROVEMENT IN SEALS FOR LOCKS.

Specification forming part of Letters Patent No. 99,831, dated February 15, 1870; reissue No. 4,872, dated April 16, 1872.

Specification of an Improvement in Seals for Locks, invented by FRANKLIN W. BROOKS, of the city, county, and State of New York.

The subject of this invention is a seal of glass, adapted to be applied to a lock in such a manner that the said seal must be broken before the lock can be opened. A leading and important peculiarity of my improved seals consists in their adaptability to be made in large quantities, and supplied at wholesale in complete readiness for use, instead of having to be formed singly at the time and place of using them, as is the case with most seals for locks heretofore devised, to be made of rigid material. The seals are intended for use to prevent access to a catch or bolt which may constitute the fastening of the lock.

Figure 1:
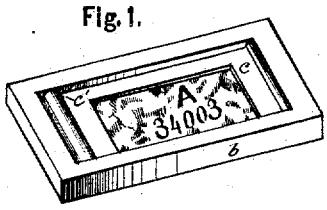
Figure 2:
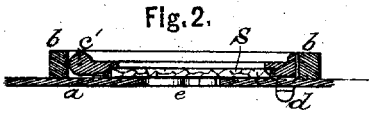
Figure 3:
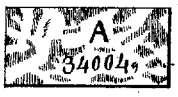

In the drawing, Figure 1 is a perspective view of a seal-case with one of my improved seals applied. Fig. 2 is a longitudinal section of the same. Fig. 3 is a plan view of the seal detached.

*a* may represent a part of the face-plate of a lock, and *b c* a casing thereon to receive the seal S, and secure it over the key-hole *e*. The parts *a b c* constitute the receptacle for the seal. This receptacle is adapted to so confine the seal that it cannot be removed in a whole condition, and so that while in position it will prevent access to the fastening of the lock. It is preferred that the metal beneath which the seal is placed shall cover or overlap the edges of the latter, while exposing its central portion, so that it may be viewed while in position. In the illustration the seal-holder or receptacle is made up of a curb or beading, *b*, formed upon or permanently attached to the face-plate *a*, and a cover, *c*, pivoted to *b* at *c'*, and provided at its free end with a stud, *d*, which is designed to be caught and held by a spring-catch within the lock when the cover is closed down, so that it cannot be again opened until the seal is broken.

The seal S, which forms the subject of my invention, is made of glass with suitable distinguishing marks. Such seals are adapted to be manufactured in large quantities, and supplied by wholesale to consumers, at a moderate cost, in readiness for instantaneous application to suitably-constructed locks, without the agency of any stamp or other tool, and when properly applied they afford most perfect security. They may be copied by photography, if desired, so that correct representations of particular seals may be preserved for reference, while the counterfeiting of such seals in the same material in which they are made may be difficult or impossible.

I claim as my invention—

A glass seal with suitable distinguishing marks, made prior to its application to the lock to be protected, and adapted for use, substantially as herein described, so that successive seals may be applied to one and the same holder without destroying the latter.

FRANKLIN W. BROOKS.

Witnesses:
E. T. LANDON,
GEO. A. EVERETT.